(12) United States Patent
Shirahama et al.

(10) Patent No.: US 7,123,305 B2
(45) Date of Patent: Oct. 17, 2006

(54) IMAGE PROCESSING APPARATUS AND METHOD, AND RECORDING MEDIUM

(75) Inventors: Akira Shirahama, Kanagawa (JP); Ken Tamayama, Tokyo (JP); Shinichiro Miyazaki, Kanagawa (JP)

(73) Assignee: Sony Corporation, (JP)

( * ) Notice: Subject to any disclaimer, the term of this patent is extended or adjusted under 35 U.S.C. 154(b) by 1169 days.

(21) Appl. No.: 09/861,124

(22) Filed: May 18, 2001

(65) Prior Publication Data

US 2002/0019988 A1 Feb. 14, 2002

(30) Foreign Application Priority Data

May 25, 2000 (JP) ............... P2000-154321

(51) Int. Cl.
   *H04N 7/00* (2006.01)
   *H04N 11/00* (2006.01)
   *H04N 7/12* (2006.01)
   *H04N 11/02* (2006.01)

(52) U.S. Cl. .................. 348/466; 348/474; 348/473; 375/240.27

(58) Field of Classification Search .......... 348/607, 348/615, 571, 576, 466, 461, 465, 473–475; 375/240.27, 240.26, 240.25, 240.24
   See application file for complete search history.

(56) References Cited

U.S. PATENT DOCUMENTS 5,455,629 A * 10/1995 Sun et al. ............. 375/240.27
6,026,506 A * 2/2000 Anderson et al. ........... 714/746
6,381,282 B1 * 4/2002 Kwan et al. ........... 375/240.27
6,530,055 B1 * 3/2003 Fukunaga ................ 714/746

FOREIGN PATENT DOCUMENTS

EP  0 946 013 A1  9/1999
JP  11-252189 A  9/1999

OTHER PUBLICATIONS

Chu, W-J et al., "Detection and Concealment of Transmission Errors in H.261 Images", IEEE Transactions on Circuits and Systems for Video Technology, vol. 8, No. 1, Feb. 1, 1998, pp. 74-84.
Katoh, H. et al., "A Flexible Transmission Technique for the Satellite ISDB System", IEEE Transactions on Broadcasting, vol. 42, No. 3, Sep. 1996, pp. 159-166.

* cited by examiner

*Primary Examiner*—Michael H. Lee
(74) *Attorney, Agent, or Firm*—Lerner, David, Littenberg, Krumholz & Mentlik, LLP

(57) ABSTRACT

Viewing of a program is enabled at optimum image quality. A correspondence table of an image signal processing parameter and a combination of TMCC information and transmission errors is stored in a RAM. A CPU reads out an image signal processing parameter corresponding to a combination of TMCC information supplied from an IF demodulator and transmission errors supplied from the IF demodulator, a demultiplexer and an MPEG video decoder from the correspondence table stored in the RAM, and controls signal processing in an image signal processing portion and display processing in an image display portion based on the image signal processing parameter.

11 Claims, 5 Drawing Sheets

STRUCTURE OF TMCC INFORMATION (IN THE CASE OF BS DIGITAL BROADCAST)

| CHANGE INSTRUCTION | TRANSMISSION MODE/SLOT INFORMATION | RELATIVE TS/SLOT INFORMATION | RELATIVE TS/TSID CORRESPONDENCE TABLE | TRANSMISSION/ RECEPTION CONTROL INFORMATION | TRANSMISSION/ RECEPTION CONTROL INFORMATION |
|---|---|---|---|---|---|
| 5 | 40 | 144 | 128 | 5 | 62 BIT |

FIG. 5

TRANSMISSION MODE (IN THE CASE OF BS DIGITAL BROADCAST)

| VALUE | MODULATION SYSTEM | CODING RATE IN ERROR CORRECTION | MINIMUM SLOT UNIT | EFFECTIVE SLOT | INEFFECTIVE SLOT |
|---|---|---|---|---|---|
| 0000 | RESERVE | RESERVE | | | |
| 0001 | BPSK | (1/2) | 4 | 1 | 3 |
| 0010 | QPSK | (1/2) | 2 | 1 | 1 |
| 0011 | QPSK | (2/3) | 3 | 2 | 1 |
| 0100 | QPSK | (3/4) | 4 | 3 | 1 |
| 0101 | QPSK | (5/6) | 6 | 5 | 1 |
| 0110 | QPSK | (7/8) | 7 | 7 | 1 |
| 0111 | TC8PSK | (2/3) | 1 | 1 | 0 |
| 1000-1110 | RESERVE | RESERVE | | | |
| 1111 | NO ALLOCATION | NO ALLOCATION | | | |

IMAGE PROCESSING APPARATUS AND METHOD, AND RECORDING MEDIUM

CROSS-REFERENCE TO RELATED APPLICATIONS

The present application claims priority from Japanese Application No. P2000-154321 filed May 25, 2000, the disclosure of which is hereby incorporated by reference herein.

BACKGROUND OF THE INVENTION

The present invention relates to an image processing apparatus and method, and a recording medium, and particularly to an image processing apparatus and method, and a recording medium in which a program of a received television broadcast can always be displayed at optimum image quality.

In recent years, digital television broadcasting has begun in earnest. In digital broadcasting, the content broadcast consists of a variety of picture images, such as a still image and a character figure, in addition to a normal moving image.

In a conventional television receiver, although the function of adjusting image quality according to the taste of a user is available, the adjustment is performed by a manual operation while the user observes a displayed image with the naked eye. As a result, where a variety of images are displayed as in a digital television broadcast, there has been a problem that, for example, the user must adjust the picture quality by himself for each content, which is difficult and time-consuming.

SUMMARY OF THE INVENTION

The present invention enables easy setting of a screen display so that a program is displayed at optimum image quality.

An image processing apparatus of the present invention includes an acquisition unit operable to acquire image data from an input signal, an extraction unit operable to extract the image data of a selected program from the acquired image data, a first detection unit operable to detect transmission information of the selected program image data, a second detection unit operable to detect a transmission error of the selected program image data, and a setting unit operable to set a signal processing parameter for processing the selected program image data based on the transmission information and the transmission error.

The acquisition unit can acquire the image data as a transport stream, the extraction unit can extract the selected program image data from the transport stream, the first detection unit can acquire the transmission information from the transport stream, and the second detection unit can acquire the transmission error detected at the time of demodulating the input signal, the time of demultiplexing the transport stream, or the time of decoding a transport stream packet of the transport stream.

There is further provided a storage unit operable to store a correspondence table of the signal processing parameter and a combination of the transmission information and the transmission error, and the setting unit can read out from the correspondence table the signal processing parameter corresponding to the combination of the transmission information and the transmission error and can set it.

The setting unit can set the signal processing parameter based on an input from a user.

An image processing method of the present invention includes acquiring image data from an input signal, extracting the image data of a selected program from the acquired image data, detecting transmission information of the selected program image data, detecting a transmission error of the selected program image data, and setting a signal processing parameter for processing the selected program image data based on the transmission information and the transmission error.

In a recording medium recorded with a computer readable program in accordance with the present invention, the program includes acquiring image data, extracting the image data of a selected program from the acquired image data, detecting transmission information of the selected program image data, detecting a transmission error of the selected program image data, and setting a signal processing parameter for processing the selected program image data based on the transmission information and the transmission error.

In the image processing apparatus and method, and the program of the recording medium according to the present invention, the image data is acquired, the image data of a selected program is extracted from the acquired image data, the transmission information of the selected program image data is detected, the transmission error of the selected program image data is detected, and the signal processing parameter for processing the selected program image data is set based on the detected transmission information and the detected transmission error. Accordingly, it becomes possible to easily watch the program at optimum image quality.

BRIEF DESCRIPTION OF THE DRAWINGS

FIG. 5 is a view for explaining the meanings of values set as transmission modes.

DETAILED DESCRIPTION

Figure 1:
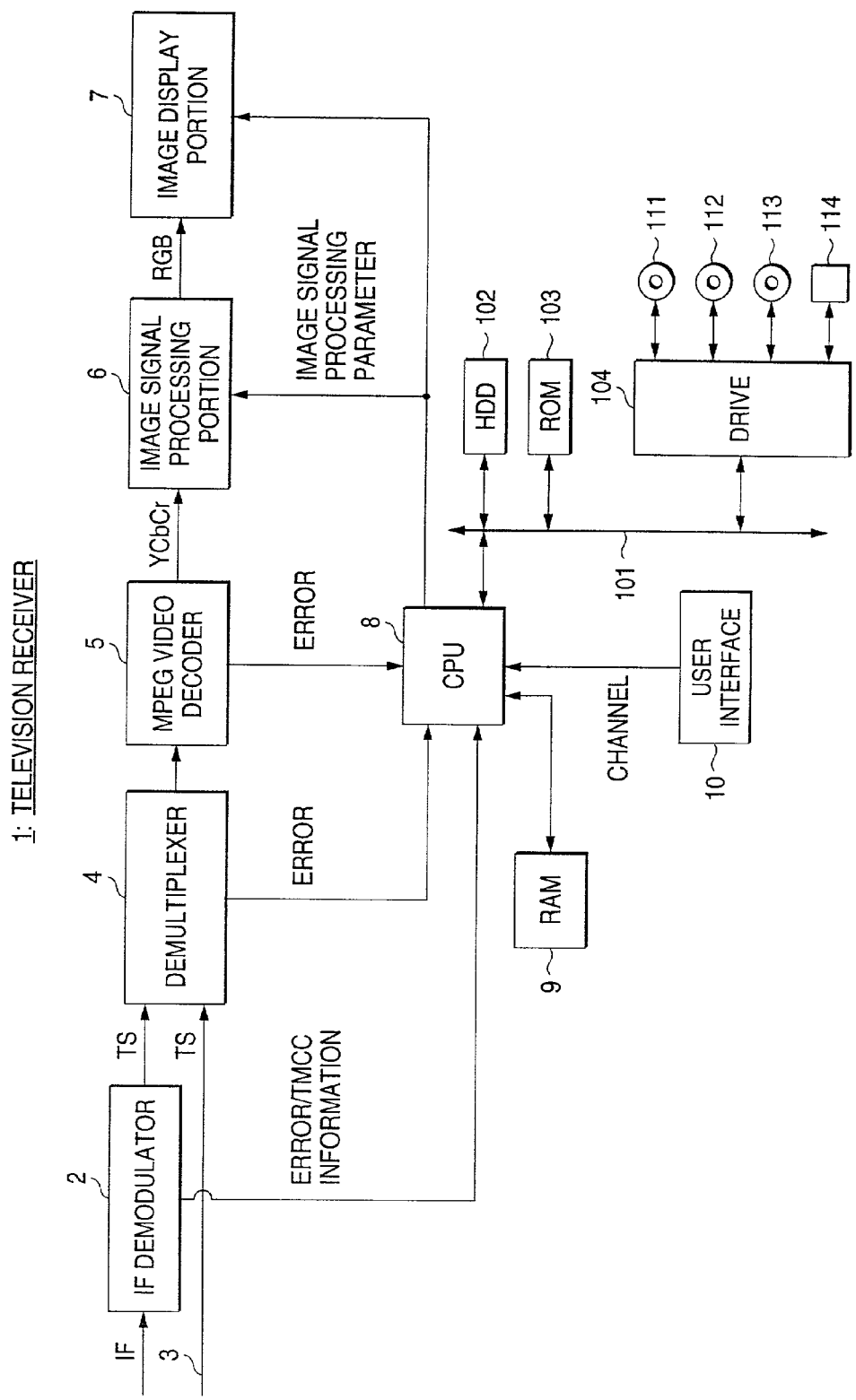
FIG. 1 is a block diagram showing a structural example of a television receiver to which the present invention is applied.

FIG. 1 shows a structural example of a television receiver 1 to which the present invention is applied. An IF demodulator 2 demodulates an IF (Intermediate Frequency) signal obtained from a digital broadcast wave received by an antenna (not shown) and outputs it as a transport stream to a demultiplexer 4. The IF demodulator 2 also acquires a transmission error detected at the time of demodulation, and outputs the acquired transmission error to a CPU 8. The IF demodulator 2 further acquires transmission information (hereinafter referred to as TMCC (Transmission Multiplexing Configuration Control) information), such as a modulation system or a coding rate, from the transport stream obtained as a result of demodulation of the IF signal, and outputs it to the CPU 8.

In addition to the output of the IF demodulator 2, a transport stream transmitted from a CATV system, a network system or the like is also supplied to the demultiplexer 4 through a transmission path 3.

The demultiplexer 4 subjects the supplied transport streams to a demultiplexing process, and outputs a transport stream packet (hereinafter referred to as a TS packet)

including image data separated as a result of the demultiplexing process to an MPEG (Motion Picture Experts Group) video decoder 5.

The demultiplexer 4 also acquires a transmission error of the TS packet including the image data detected at the time of demultiplexing processing, and outputs the acquired transmission error to the CPU 8.

The MPEG video decoder 5 decodes the TS packet including the image data supplied from the demultiplexer 4, generates a luminance signal and a color-difference signal, and outputs them to an image signal processing portion 6. The MPEG video decoder 5 also acquires a transmission error detected at the time of decoding, and outputs the acquired transmission error to the CPU 8.

The image signal processing portion 6 generates an RGB signal from the luminance signal and the color-difference signal supplied from the MPEG video decoder 5, and supplies it to an image display portion 7. The image display portion 7 is formed of a CRT (Cathode Ray Tube) or an LCD (Liquid Crystal Display), and displays an image corresponding to the RGB signal from the image signal processing portion 6.

The CPU 8 controls the respective portions in response to an input from a user interface 10 so as to output a signal corresponding to an operation of a user. For example, the CPU 8 generates an image signal processing parameter on the basis of the TMCC information supplied from the IF demodulator 2, and the transmission errors supplied from the IF demodulator 2, the demultiplexer 4, and the MPEG video decoder 5, and controls the image signal processing portion 6 and the image display portion 7 on the basis of the image signal processing parameter.

Data and programs necessary for the CPU 8 to execute various processes are stored in a RAM 9. For example, RAM 9 stores a correspondence table of the image signal processing parameter and a combination of the TMCC information and the transmission errors supplied from the IF modulator 2, the demultiplexer 4, and the MPEG video decoder 5. The correspondence table is supplied to the CPU 8.

An HDD 102, a ROM 103, and a drive 104 are connected to the CPU 8 through a bus 101. As a recording medium, a magnetic disk 111, an optical disk 112, a magneto-optical disk 113, or a semiconductor memory 114 may be mounted on the drive 104.

Figure 2:
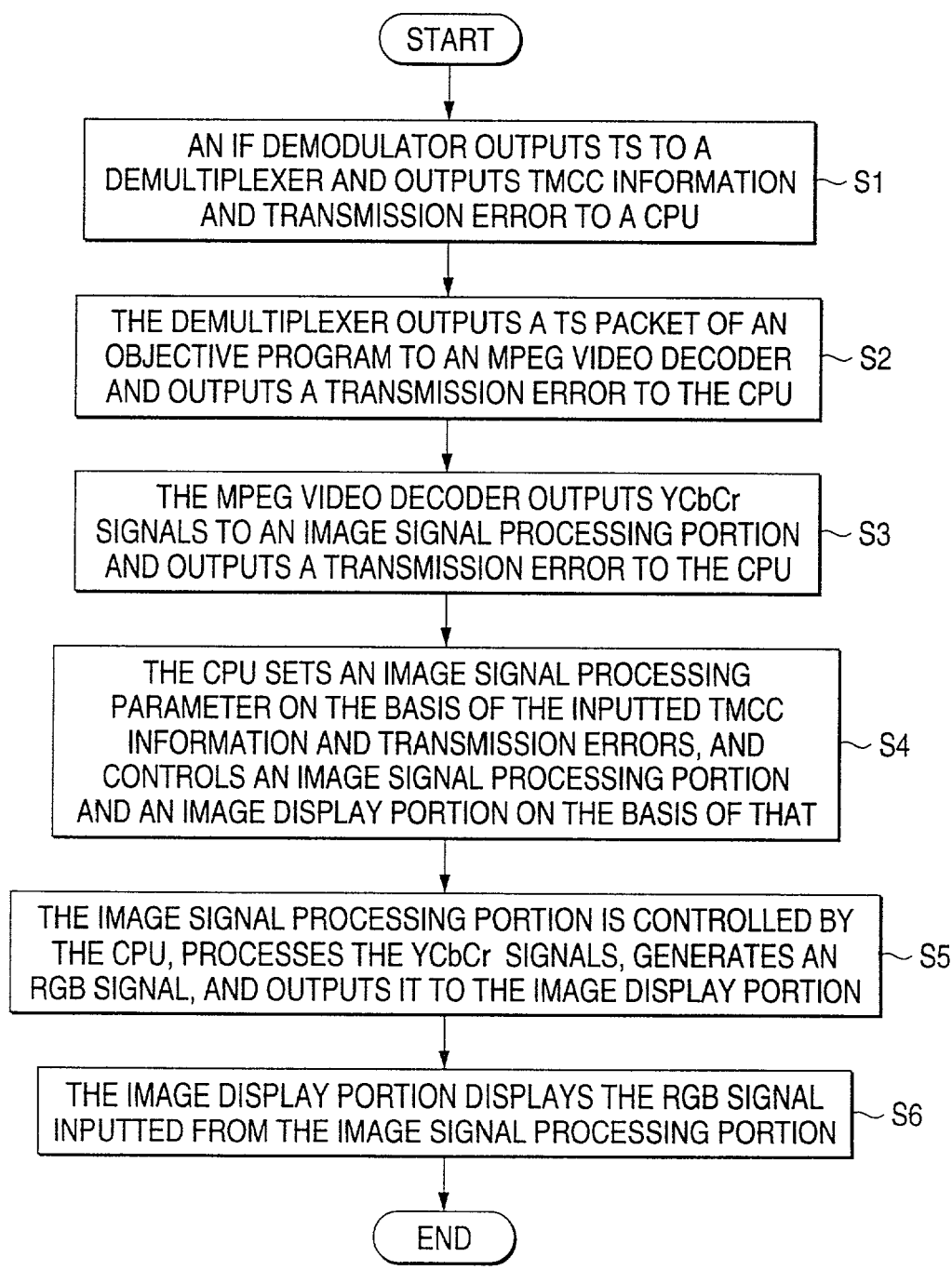
FIG. 2 is a flowchart for explaining the operation of the television receiver of FIG. 1.

Next, the operation of the television receiver 1 will be described with reference to the flowchart of FIG. 2.

At step S1, the IF demodulator 2 demodulates an IF signal obtained from a digital broadcast wave received by an antenna (not shown), generates a transport stream, and outputs the transport stream to the demultiplexer 4. The IF demodulator 2 also acquires a transmission error detected at the time of demodulation and supplies it to the CPU 8. Further, the IF demodulator 2 acquires TMCC information included in the transport stream and supplies it to the CPU 8.

Figure 3:
FIG. 3 is a view for explaining the structure of TMCC information.

FIG. 3 shows a data structure of the TMCC information. The TMCC information includes a "change instruction" of 5 bits, "transmission mode/slot information" of 40 bits, "relative TS/slot information" of 144 bits, a "relative TS/TSID correspondence table" of 128 bits, "transmission/reception control information" of 5 bits, and "transmission/reception control information" of 62 bits.

Figure 4:
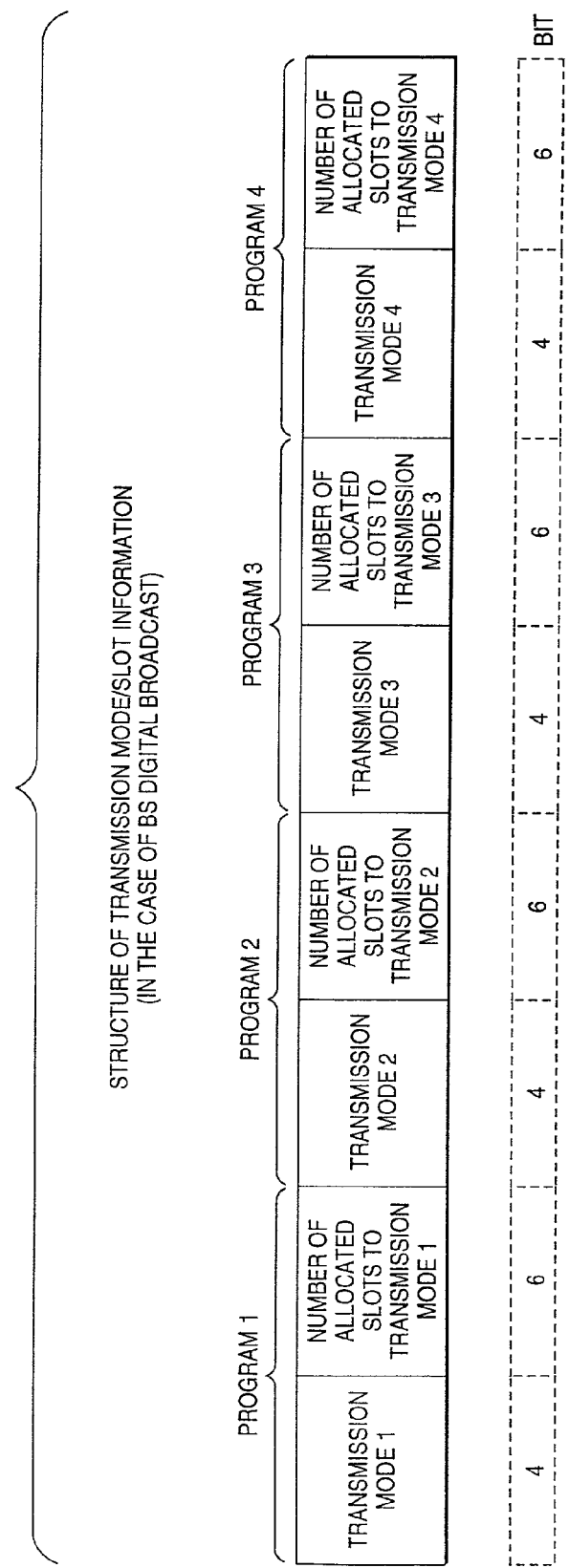
FIG. 4 is a view for explaining the structure of transmission mode/slot information.

FIG. 4 shows a data structure of the "transmission mode/slot information" of the TMCC information. The "transmission mode/slot information" includes "transmission mode" (4 bits) and "number of allocated slots to the transmission mode" (6 bits) for each of four programs 1 to 4.

FIG. 5 shows the meanings of values set as "transmission mode" of the "transmission mode/slot information". The value set as the "transmission mode" can indicate a modulation system, a coding rate in error correction, a minimum slot unit, an effective slot, and an ineffective slot.

For example, the value 2 (0010) as the "transmission mode" indicates that the modulation system is QPSK, the coding rate in error correction is ½, the minimum slot unit is 2 slots, the effective slot is 1 slot, and the ineffective slot is 1 slot. The value 7 (0111) indicates that the modulation system is TC8PSK, the coding rate in error correction is ⅔, the minimum slot unit is 1 slot, the effective slot is 1 slot, and the ineffective slot is 0 slots.

Next, at step S2, the demultiplexer 4 separates a TS packet holding video data of an objective program from PSI (Program Specific Information) and SI (Service Information) included in the supplied transport stream, and outputs it to the MPEG video decoder 5. The PSI is specific information of a broadcast (program) prescribed by the MPEG, and the SI is information which is unique to a broadcasting business. The demultiplexer 4 also acquires a transmission error detected at the time of demultiplexing processing and outputs it to the CPU 8.

At step S3, the MPEG video decoder 5 decodes the TS packet including the video data by the MPEG system, generates a luminance signal (Y) and color-difference (Cr, Cb) signals, and outputs them to the image signal processing portion 6. The MPEG video decoder 5 also acquires a transmission error detected at the time of demodulation and outputs it to the CPU At step S4, the CPU 8 sets an image signal processing parameter on the basis of the TMCC information from the IF demodulator 2 and the transmission error detection results from the IF demodulator 2, the demultiplexer 4, and the MPEG video decoder 5. The CPU 8 controls the image signal processing portion 6 and the image display portion 7 on the basis of the set image signal processing parameter.

Specifically, the CPU 8 refers to the correspondence table of the image signal processing parameter and the combination of the TMCC information and the transmission errors, which is stored in the RAM 9, and detects the image signal processing parameter corresponding to the combination of the supplied TMCC information and transmission errors.

For example, in the case where the value 7 (0111) is set as the "transmission mode" in the "transmission mode/slot information" included in the TMCC information (FIG. 5) and there are few transmission errors, an image signal processing parameter having contents as shown below is set:
sharpness is made low;
NR (Noise Reduction) is cut;
VM (Velocity Modulation) is cut;
enhancement processing is intensified;
scanning structure is made interlaced; and
display resolution is increased.

That is, in this case, since the modulation system is TC8PSK, the coding rate in error correction is ⅔ (high class service in which the number of allocated slots is large), and there are few transmission errors, it is recognized that the image data of the TS packet is a high quality image, and the image signal processing parameter is set so that the image is displayed at the original image quality.

In the case where the value 2 (0010) is set as the "transmission mode" in the "transmission mode/slot information" included in the TMCC information (FIG. 5) and there are a lot of transmission errors, an image signal processing parameter having contents as shown below is set:
sharpness is made low;

NR is enhanced;
enhancement processing is cut;
scanning structure is made progressive; and
display resolution is decreased.

That is, in this case, since the modulation system is QPSK, the coding rate in error correction is ½ (low class service in which the number of allocated slots is small), and there are a lot of transmission errors, it is recognized that the image data of the TS packet is a low quality image, and the image signal processing parameter is set so that the poorness of the original image quality is concealed.

Next, at step S5, the image signal processing portion 6 processes the luminance signal and the color-difference signals supplied from the MPEG video decoder 5 through control of the CPU 8 based on the image signal processing parameter, generates the RGB signal, and outputs it to the image display portion 7.

At step S6, the image display portion 7 displays an image corresponding to the RGB signal supplied from the image signal processing portion 6 through control of the CPU 8 based on the image signal processing parameter. Thereafter, the processing is ended.

In the above, although the description has been made in the case, as an example, where the signal processing in the image signal processing portion 6 and the display processing in the image display portion 7 are controlled on the basis of the image signal processing parameter, it is also possible to make a modification so that only the signal processing in the image signal processing portion 6 is controlled on that basis.

In the present invention, it is also possible to change the setting of the image signal processing parameters for a particular program (series program) according to the taste of the user through operation of the user interface 10. When the settings are changed, the image signal processing parameters are stored in the RAM 9, and thereafter, when the same program is selected by the user, the signal processing in the image signal processing portion 6 and the image display portion 7 are controlled on the basis of the image signal processing parameters stored for that program, and the image is displayed.

Further, in the case where a plurality of images are displayed in a plurality of windows of one screen at the same time, a display (output) may be controlled for each of the images displayed in the respective windows.

Although the description above has been made in the case where the present invention is applied to a television receiver, the present invention can be applied to any devices, such as an IRD (Integrated Receiver/Decoder) or a personal computer, which process digital data.

Although the foregoing series of processes can be executed by hardware, they can also be executed by software. In the case where the series of processes are executed by software, a program constituting the software is installed from a recording medium to a computer incorporated in dedicated hardware, or, for example, a multi-purpose personal computer which can execute various functions by installing various programs.

As shown in FIG. 1, this recording medium consists not only of a package medium which is separate from a computer and is distributed to the user to provide a program and in which the program is recorded, such as a magnetic disk 111 (including a floppy disk), an optical disk 112 (including a CD-ROM (Compact Disk-Read Only Memory) and a DVD (Digital Versatile Disk)), a magneto-optical disk 113 (including an MD (Mini-Disk)), or a semiconductor memory 114, but also by a ROM 103 or an HDD 102 which is provided to the user in the state in which it is previously incorporated in the computer and in which the program is recorded.

Incidentally, in the present specification, steps describing the program recorded in the recording medium naturally include processes carried out in time series along the recited sequence, and also include processes which are not necessarily processed in time series but are executed in parallel or individually.

Besides, in the present specification, the system indicates an entire apparatus consisting of a plurality of devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An image processing apparatus, comprising:
an acquisition unit operable to acquire image data from an input signal and detect transmission information from the acquired image data;
a decoding unit operable to decode the acquired image data, and extract a transmission error; and
a setting unit operable to set a signal processing parameter based on the transmission information and the transmission error and to control processing of the acquired image data on the basis of the signal processing parameter to enable an image or images corresponding thereto to be displayed on the display with optimum quality,
in which the transmission information includes transmission mode information which is indicative of a modulation system, and in which the setting unit is operable to set the signal processing parameter in accordance with the transmission mode information and a number of transmission errors such that a first signal processing parameter having a first content is set when a first modulation system is utilized and there are few transmission errors, and such that a second signal processing parameter having a second content is set when a second modulation system different from the first modulation system is utilized and there are many transmission errors.

2. An image processing apparatus according to claim 1, further comprising a storage unit operable to store a correspondence table of the signal processing parameter and a combination of the transmission information and the transmission error,
wherein the setting unit reads out from the correspondence table the signal processing parameter corresponding to the combination of the transmission information and the transmission error and sets it.

3. An image processing apparatus according to claim 1, wherein the setting unit sets the signal processing parameter based on an input from a user.

4. An image processing apparatus according to claim 3, further comprising changing means for changing the signal processing parameter based on the input from the user.

5. An image processing method, comprising:
acquiring image data from an input signal;
detecting transmission information from the acquired image data;

decoding the acquired image data, and extracting a transmission error; and setting a signal processing parameter based on the transmission information and the transmission error and controlling processing of the acquired image data on the basis of the signal processing parameter to enable an image or images corresponding thereto to be displayed on the display with optimum quality, in which the transmission information includes transmission mode information which is indicative of a modulation system, and in which the signal parameter is set in accordance with the transmission mode information and a number of transmission errors such that a first signal processing parameter having a first content is set when a first modulation system is utilized and there are few transmission errors, and such that a second signal processing parameter having a second content is set when a second modulation system different from the first modulation system is utilized and there are many transmission errors.

6. An image processing method according to claim 5, further comprising storing a correspondence table of the signal processing parameter and a combination of the transmission information and the transmission error; and the setting step includes reading out from the correspondence table the signal processing parameter corresponding to the transmission information and the transmission error and setting the signal processing parameter read out.

7. An image processing method according to claim 5, wherein the setting step includes setting the signal processing parameter based on an input from a user.

8. An image processing method according to claim 7, further comprising changing the signal processing parameter based on the input from the user.

9. A recording medium recorded with a computer readable program for processing images, the program comprising:

acquiring image data;

detecting transmission information from the acquired image data;

decoding the acquired image data, and extracting a transmission error; and setting a signal processing parameter based on the transmission information and the transmission error and controlling processing of the acquired image data on the basis of the signal processing parameter to enable an image or images corresponding thereto to be displayed on the display with optimum quality, in which the transmission information includes transmission mode information which is indicative of a modulation system, and in which the signal parameter is set in accordance with the transmission mode information and a number of transmission errors such that a first signal processing parameter having a first content is set when a first modulation system is utilized and there are few transmission errors, and such that a second signal processing parameter having a second content is set when a second modulation system different from the first modulation system is utilized and there are many transmission errors.

10. An image processing apparatus according to claim 1, wherein the decoding unit is operable to output therefrom a luminance signal and a color difference signal, and further comprising a processing unit operable to receive the luminance signal and the color difference signal from the decoding unit and to generate an RGB (red green blue) signal therefrom.

11. An image processing method according to claim 5, further comprising supplying a luminance signal and a color difference signal, and generating an RGB (red green blue) signal from the luminance signal and the color difference signal.

* * * * *